(12) United States Patent
Shah et al.

(10) Patent No.: US 11,172,293 B2
(45) Date of Patent: Nov. 9, 2021

(54) POWER EFFICIENT CONTEXT-BASED AUDIO PROCESSING

(71) Applicant: Ambiq Micro, Inc., Austin, TX (US)

(72) Inventors: Arpit Shah, Austin, TX (US); Scott McLean Hanson, Austin, TX (US); Stephen Howard Nease, Austin, TX (US)

(73) Assignee: AMBIQ MICRO, INC., Austin, TX (US)

( * ) Notice: Subject to any disclaimer, the term of this patent is extended or adjusted under 35 U.S.C. 154(b) by 186 days.

(21) Appl. No.: 16/508,062

(22) Filed: Jul. 10, 2019

(65) Prior Publication Data

US 2020/0021913 A1 Jan. 16, 2020

Related U.S. Application Data

(60) Provisional application No. 62/696,707, filed on Jul. 11, 2018.

(51) Int. Cl.
*H04R 3/04* (2006.01)
*G06F 3/16* (2006.01)
*G06F 3/01* (2006.01)
*G06F 40/205* (2020.01)

(52) U.S. Cl.
CPC .............. *H04R 3/04* (2013.01); *G06F 3/011* (2013.01); *G06F 3/017* (2013.01); *G06F 3/167* (2013.01); *G06F 40/205* (2020.01)

(58) Field of Classification Search
CPC .......... A61F 9/08; G06F 1/3231; G06F 3/011; G06F 3/017; G06F 3/041; G06F 3/165; G06F 3/167; G06F 40/205; G06F 3/0346; G06F 3/0488; G06F 3/04842; G10L 15/08; G10L 21/0208; G10L 25/21; G10L 25/63; G10L 15/20; G10L 15/26; H02S 40/38; H04L 1/1825; H04R 1/323; H04R 1/403; H04R 3/04; H04R 27/00; H04R 29/007; H04S 7/305; A45B 25/143; G08B 21/182; H04W 52/245
USPC ........ 348/231.4; 375/219, 260; 381/86, 355; 704/200, 275, 207, 225, 231, 270, 500; 340/573.1; 706/48
See application file for complete search history.

(56) References Cited

U.S. PATENT DOCUMENTS

| | | | | |
|---|---|---|---|---|
| 5,835,895 A * | 11/1998 | Stokes, III | ......... | H03H 17/0294 704/500 |
| 7,464,065 B2 * | 12/2008 | Gleason | ................. | G10L 13/04 706/48 |
| 7,831,420 B2 * | 11/2010 | Sinder | ................... | G10L 21/003 704/225 |

(Continued)

*Primary Examiner* — Gerald Gauthier
(74) *Attorney, Agent, or Firm* — David R. Stevens; Stevens Law Group

(57) ABSTRACT

A low power voice processing system that includes a plurality of non-audio sensors, at least one microphone system, and a plurality of audio modules, at least some of which can be configured in selected modes. A context determination module is connected to the plurality of audio modules, and further connected to receive input from the plurality of non-audio sensors and the at least one microphone system. The context determination module acts to determine use context for the voice processing system and at least in part selects mode operation of at least some of the plurality of audio modules.

18 Claims, 4 Drawing Sheets

(56) References Cited

U.S. PATENT DOCUMENTS

| | | | | |
|---|---|---|---|---|
| 8,504,370 B2* | 8/2013 | Hong | ................... | G10L 15/193 |
| | | | | 704/270 |
| 8,738,368 B2* | 5/2014 | Gratke | ................... | G10L 21/02 |
| | | | | 704/200 |
| 10,157,626 B2* | 12/2018 | Nahman | ............... | A61B 5/0075 |
| 10,306,359 B2* | 5/2019 | Sekiya | ................. | H04M 9/082 |
| 10,909,979 B1* | 2/2021 | Chu | ................... | G08B 21/182 |
| 2007/0143102 A1* | 6/2007 | Yamada | ............... | H04L 67/146 |
| | | | | 704/200 |
| 2012/0143601 A1* | 6/2012 | Beerends | ................ | G10L 25/69 |
| | | | | 704/207 |
| 2012/0219040 A1* | 8/2012 | Valentine | ............ | H04B 7/0877 |
| | | | | 375/219 |
| 2012/0262296 A1* | 10/2012 | Bezar | ................... | G10L 25/63 |
| | | | | 340/573.1 |
| 2013/0028340 A1* | 1/2013 | Yang | ................... | H04B 7/0639 |
| | | | | 375/260 |
| 2013/0325459 A1* | 12/2013 | Levien | ................. | G10L 15/065 |
| | | | | 704/231 |
| 2014/0241559 A1* | 8/2014 | Mulder | .................. | H04R 3/02 |
| | | | | 381/355 |
| 2014/0278437 A1* | 9/2014 | Shen | ................... | G10L 15/22 |
| | | | | 704/275 |
| 2014/0278441 A1* | 9/2014 | Ton | ..................... | G10L 15/26 |
| | | | | 704/275 |
| 2014/0362253 A1* | 12/2014 | Kim | ....................... | G06T 7/70 |
| | | | | 348/231.4 |
| 2015/0117669 A1* | 4/2015 | Kwon | ................... | H04R 3/005 |
| | | | | 381/86 |
| 2016/0111111 A1* | 4/2016 | Levitt | ................... | G10L 15/24 |
| | | | | 704/231 |
| 2016/0253149 A1* | 9/2016 | Iyer | ..................... | G06F 1/1694 |
| | | | | 704/275 |
| 2016/0295516 A1* | 10/2016 | Su | ..................... | H04W 28/0221 |
| 2017/0168595 A1* | 6/2017 | Sakaguchi | .............. | G06F 1/325 |
| 2017/0242651 A1* | 8/2017 | Lang | ....................... | G06F 3/165 |
| 2018/0293980 A1* | 10/2018 | Dwarakanath | .......... | G06F 3/167 |
| 2018/0336009 A1* | 11/2018 | Yoganandan | ........ | G06F 3/0346 |
| 2018/0342151 A1* | 11/2018 | VanBlon | ................. | G06F 3/167 |
| 2019/0087878 A1* | 3/2019 | Gharabegian | ...... | G06Q 30/0601 |
| 2019/0124462 A1* | 4/2019 | Lindahl | .................. | G06F 3/167 |
| 2019/0172450 A1* | 6/2019 | Mustiere | ................ | G10L 15/20 |
| 2019/0311718 A1* | 10/2019 | Huber | ................... | G06F 1/3231 |
| 2019/0391783 A1* | 12/2019 | Moore | ................ | H04R 29/002 |
| 2019/0394602 A1* | 12/2019 | Moore | ................... | H04R 1/403 |
| 2019/0394603 A1* | 12/2019 | Moore | ..................... | H04R 5/04 |
| 2020/0021913 A1* | 1/2020 | Shah | ..................... | H04S 7/302 |

\* cited by examiner

POWER EFFICIENT CONTEXT-BASED AUDIO PROCESSING

RELATED APPLICATION

This application is a continuation of U.S. Application Ser. No. 62/696,707, filed Jul. 11, 2018, and entitled Power Efficient Context-Based Audio Processing, which is hereby incorporated herein by reference in its entirety for all purposes.

FIELD OF THE INVENTION

This invention relates to voice activated interfaces to computing systems. Power efficient voice activity detection and command phrase detection that can vary in audio module utilization according to location, activity, environment, or other context are described.

BACKGROUND AND SUMMARY OF THE INVENTION

Many applications for electronic systems need support of voice commands. For example, voice controlled personal assistant systems are widely available as part of fixed or mobile devices, or as an independent application ("app"), as software programs, or as operating system user interface modules for a smartphone, laptop, or other type of computer. Voice recognition, interpretation and response can be done locally, or as part of an Internet-based server network ("cloud computing") that typically involves filtering and compressing voice or sound recordings to be sent to server or server network for analysis. Voice synthesis is used to provide automated spoken replies that can be streamed back to a local device.

For mobile devices or other voice-controlled system components that rely on batteries, supporting voice command can benefit from an ability to wake a device from a standby or sleep state without using a touch-screen or physically depressing a button or keyboard, and supporting a full range of voice command without a perceived lag in response time. Unfortunately, low power operation of systems capable of providing such voice activity detection and command phrase detection in difficult. The system described herein provides an improved approach.

In one embodiment an improved voice processing system includes a plurality of non-audio sensors, at least one microphone system, and a plurality of audio modules, at least some of which can be configured in selected modes. A context determination module is connected to the plurality of audio modules, and further connected to receive input from the plurality of non-audio sensors and the at least one microphone system. The context determination module acts to determine use context for the voice processing system and selecting mode operation of at least some of the plurality of audio modules.

In some embodiments, the plurality of non-audio sensor systems includes at least one member of the following: accelerometer, vibration sensor, light sensor, gyroscopes, buttons, touch screen input, keyboard input, received wireless connection, camera/video input, ultrasonic sensor, LIDAR sensor, fingerprint sensor, magnetic field sensor, pressure, step counter, and GNSS/GPS derived input.

In other embodiments, the plurality of audio modules includes a voice activity detection module, a beam forming module, a noise reduction module, a key word detection module, and a command phrase detection module. Mode operation distinctions for the various audio modules can include at least one of selected sleep states, power modes, activation, sampling rate, bit precision, filter state, filter usage, processing speed, available machine learning systems, number of connected microphones, and available connected memory.

Context identifiable by the context determination module can include at least one of location, an activity, and an environment. For example, the physical location of a person using a smartphone with the voice processing system can be distinguished between a bedroom and a work office, with different identified context being used to adjust voice processing modes. As another example, context for activities such as sleeping or eating can be distinguished, or environments such as windy outdoors or crowded rooms can be distinguished an used to modify voice processing modes.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
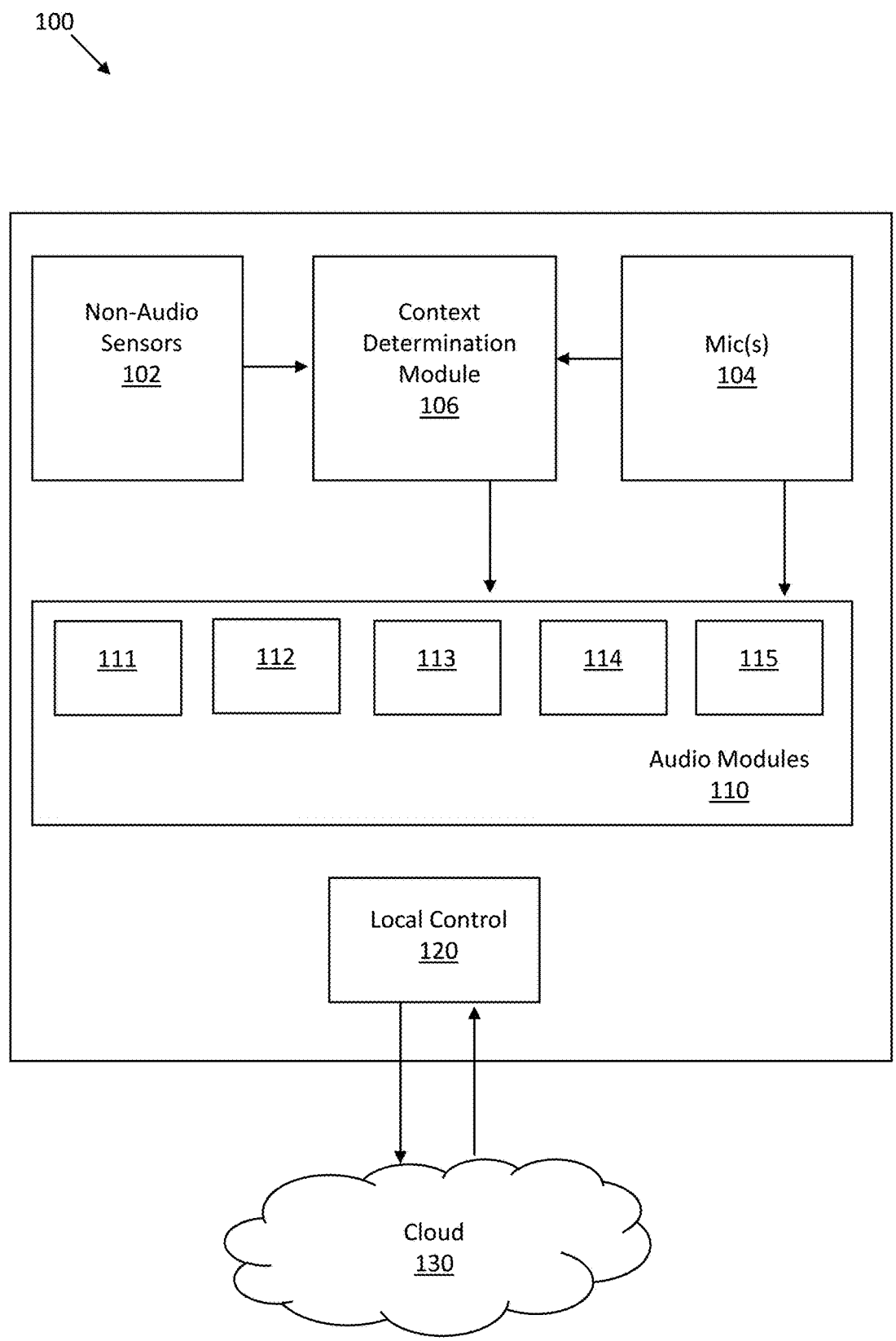
FIG. 1 is a schematic block diagram of a voice processing system for use in accordance with an embodiment.

Referring to FIG. 1, the voice processing system 100 disclosed herein may include non-audio sensors 102 and one or more microphones 104. Both non-audio sensors 102 and one or more microphones 104 are connected to a context determination module 106, which is in turn connected to control audio modules 110. The audio modules 110 can include hardware, software, or combined hardware/software implementations that provide various voice processing functionality.

Audio modules 110 can include, but are not limited to, a voice activity detection module 111, a beam forming module 112, a noise reduction module 113, a key word detection module 114, and a command phrase detection module 115. In some embodiments, other audio modules can include an acoustic echo cancellation module, a wind noise rejection module, and automatic gain control module, and an active noise cancellation module.

The audio modules can switch between various functional, power, or operation modes, as determined at least in part by the context determination module 106. These functional, power, or operation modes can be adjusted to meet a desired power usage and performance metrics, and can include, but are not limited to, modifications of sleep states, power modes, activation, sampling rate, bit precision, filter state, filter usage, processing speed, ADC configuration, adjustments to sensitivity of sensors or microphones, adjustments to performance of a programmable gain amplifier, selection of decimation or anti-aliasing filters, number of filter taps, adaptive filter update rate, number of sub-bands, selected filter coefficients, available machine learning systems, number of connected microphones used, and available connected memory. In one embodiment, a Signal to Noise ratio can be a performance metric for various modules within the voice processing system.

Data received or sent by the audio modules 110 can be utilized or directed by a local control system 120, alone or in combination with a cloud or server based remote network 130. Filtered, compressed, or modified voice data can be received by the cloud network 130 and subjected to additional memory or processor intensive voice analysis. In some embodiments, the context determination module 106 can also communicate with the cloud network 130, sending sensor data or other information to assist in context identification that can be used to switch modes of the various audio modules.

Non-audio sensor systems can be on-board a device such as a smartphone or voice assistant device or connected in wireless or wired connection. Sensor systems can include an accelerometer, a multiple-degree of freedom sensor (e.g. 3-DOF), a vibration sensor, a light sensor, a gyroscope, buttons, touch screen input, keyboard input, received wireless connection, camera/video input, ultrasonic sensor, LIDAR sensor, fingerprint sensor, magnetic field sensor, pressure, step counter, GNSS/GPS derived input, proximity sensor, temperature sensor, and oxygen sensor.

Context identified by these sensors, alone or in combination with microphone input, can include at least one of location, an activity, and an environment. For example, location contexts can include identification of a school, church, office, bar, street, indoor/outdoor, movie theater, restaurant, hospital, dance venue, car, train, bus, airplane. Activity context can include identification of listening, sleeping, running, biking, swimming, meeting, talking, or drinking. Environment context can include conditions such a quiet, windy, thunder storm, rain, or snowing. Environment can also include numbers and position of other persons, animals, or machine sounds. The environmental context can also be modified by the frequency, levels, or percussive or other nature of detected sensor input.

Figure 2:
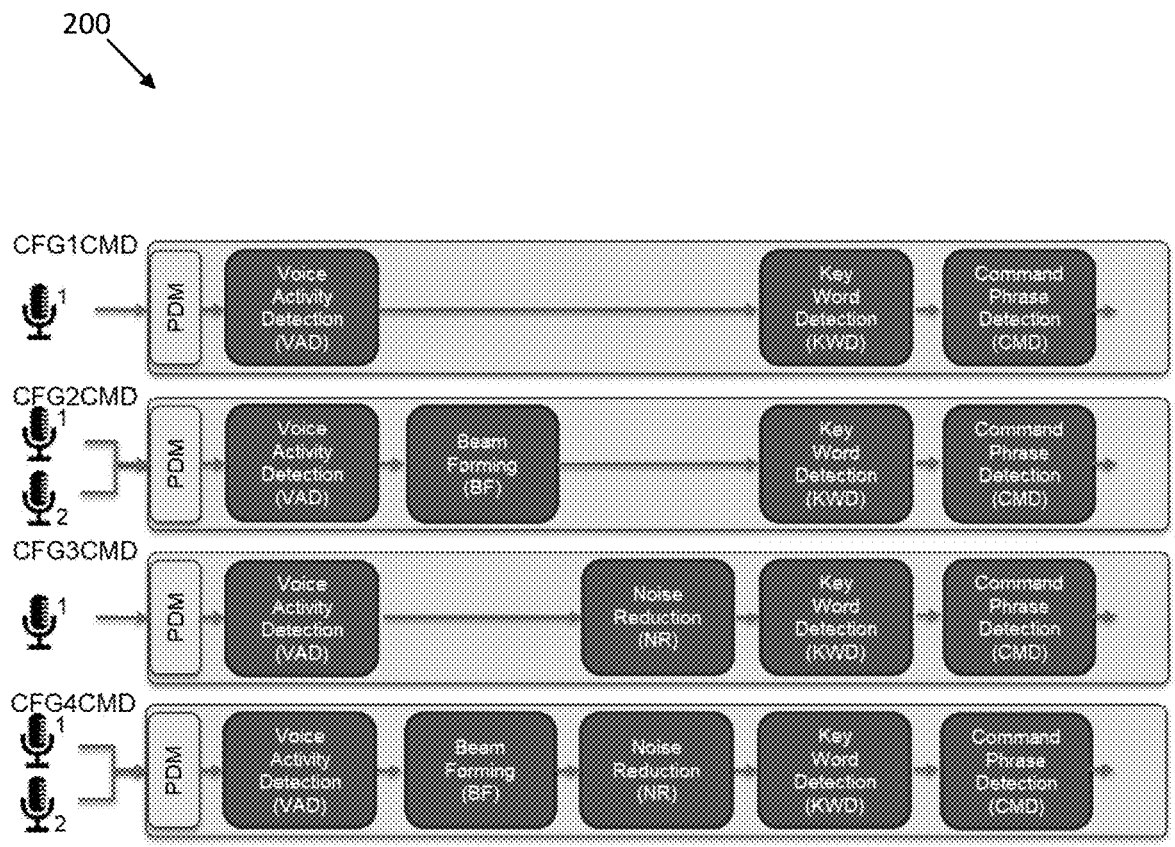
FIG. 2 is a schematic block diagram with example activation states for audio modules in differing contexts.

FIG. 2 is a schematic block diagram with example configuration or activation states for audio modules in differing contexts. As seen in FIG. 2, CFG1CMD has single microphone input that is provided through a pulse density modulation (PDM) module to a voice activity detection (VAD) module. Due to the detected context conditions that include use of a single microphone and a low noise office environment, a beam forming (BF) and noise reduction (NR) module are inactivated or placed in a low power or sleep mode. The voice activity detection module (VAD) provides data to a key word detection module (KWD), which in turn provides data to the command phrase detection module (CMD). The command phrase can be processed locally to modify activity of the voice processing system or can be remotely communicated to a cloud network for further processing.

Similarly, CFG2CMD illustrates use of multiple microphones (that benefit from use of a beam forming module (BF), but in a quiet environmental context that does not require activation of the noise reduction module (NF). CFG3CMD illustrates use of a single microphone that does not need a beam forming module (BF), but in a noisy or crowded environmental context that benefits from use of the noise reduction module (NF). CFG4CMD illustrates use of all the audio processing modules (i.e. VAD, BF, NR, KWD, and CMD) but can still support adjustments to various levels of performance, processing activity, or power usage based on context.

Such gradations in levels of performance, processing activity, or power usage can include, but is not limited to, number of microphones used, adjustments to sensitivity of sensors or microphones, including adjustments to performance of a programmable gain amplifier or analog to digital converters (ADC). Usage of filters or modifications to active filters can involve various selections of decimation or anti-aliasing filters. Sampling rate, bit precision, number of filter taps, adaptive filter update rate, number of sub-bands, and selected filter coefficients can all be adjusted according to identified context.

Other adjustment can include video processing parameters such as frame rate, resolution, or color depth. Selection of specific machine learning mechanisms, memory and processing power availability, and size, training or tuning requirements of, for example, a support vector machine or neural network model can all be adjusted.

To better appreciate various types of mode selection with respect to the voice processing example illustrated in FIG. 2, the following TABLE 1 is provided:

| Determination of Context | Context | Potential Implication | Mode selection |
|---|---|---|---|
| 3-DOF sensor (Degree of Freedom) | Bring-to-see event | Wrist device is pointed at user's face. MIC directionality has high probability of value. | Use BF ("Beam Forming") |
| | Accel indicates stationary and not on body frame | Device is likely not in direction of user's face. MIC directionality has low probability of value. | Do not use BF |
| Microphone | Quiet room | With large period environment sampling... determine quiet and use CFG1 when sound is present or determine noisy and use CFG3/4 when sound is present. | Use CFG1 or CFG4, correct power/performance operating point |
| 6DoF sensor | Contextual awareness indicates running or exercising | User is likely to need running or exercising or music functions | Load "running" or "exercising" CMD library |

-continued

| Determination of Context | Context | Potential Implication | Mode selection |
|---|---|---|---|
| Microphone | VUI: user indicates context of running or exercising | User is likely to need running or exercising or music functions | Load "running" or "exercising" CMD library |
| Light Sensor | In dark (pocket or drawer) | Not sufficient light to perceive face | Disable FD ("Face Detection") |
| Imager | Change (or no change) in image sensor data | Change in sensor data implies need for FD analysis | Disable "full" FD during static periods |
| Imager | Circle detector | Low MCPS "circle" detector used to gate "full" FD | Disable "full" FD when "circle" not present in FoV |
| Imager + 3DoF Sensor | Bring-to-see event | Wrist device is likely pointed at user's face, high probability of needing FD. | Use FD |
| Imager | Probability of face | If FD mode indicates high or low probability of face, run FD at lower frequency. If FD mode indicates ~50%, run FD at higher frequency due to uncertainty. | Control FD rate as a function of confidence of result |
|  | Bring-to-see event | Wrist device is likely pointed at user's face, check for "circle" before enabling high power back light. | Use FD to control back light |

To better appreciate changes to power usage with respect to various types of mode selection the following TABLE 2 is provided:

|  | LPSD/ KWD | QSD + BF + LPSD/KWD | QSD + NR + LPSD/KWD | QSD + BF + NR + LPSD/KWD |
|---|---|---|---|---|
| Mics | 1 | 2 | 1 | 2 |
| Computation Type | Time Domain | Time Domain | Frequency Domain | Frequency Domain |
| Quiet Average Compute Requirements (MCPS) | 1 | 1 | 1 | 1 |
| Trigger Average Compute Requirements (MCPS) | 15 | 26 | 27 | 33 |
| Flash (kB) | 138 | 140 | 230 | 230 |
| SRAM (kB) | 75 | 79 | 87 | 91 |
| % Detection at 0 dB SNR | 56% | 74% | 71% | 79% |
| % Detection at 10 dB SNR | 91% | 94% | 98% | 98% |

Figure 3:
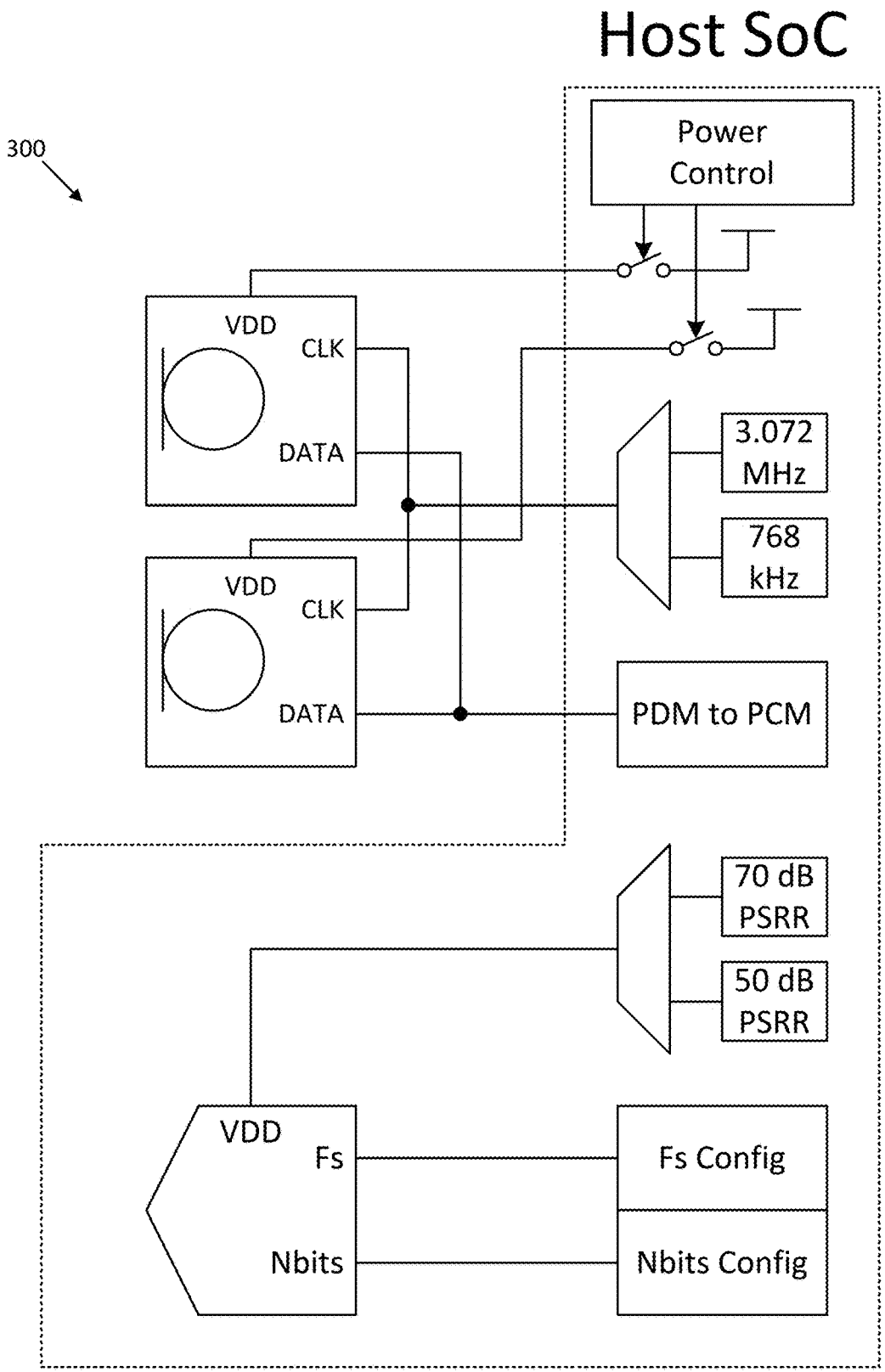
FIG. 3 is a schematic diagram of a voice processing system implemented in conjunction with a System on a Chip (SoC)

FIG. 3 illustrates a hardware implementation 300 on a System on a chip (SoC) supporting two microphones and an analog to digital converter (ADC, and where Fs=sampling rate, Nbits=number of bits). The host SoC includes muxes and switches to control the microphones and the ADC. The PDM to PCM process converts oversampled 1-bit pulse density modulation audio data to audio-rate (8 to 48 kHz) multi-bit (16 to 32 bit) pulse code modulation data.

The host SoC can change the configuration of the hardware depending on the context. For example, in noisy contexts, both digital MICs will be powered up (VDD set to 1.8V) and processed at a high sample rate (3.072 MHz). Analog MICs typically use a high-quality power supply (70 dB PSRR), high sampling rate (Fs), and high number of bits. Unfortunately, a downside of this configuration is consumption of a significant amount of energy. In relatively noiseless contexts, some of these parameters can be relaxed. One digital MIC could be powered off, for example, and the other MIC could be clocked at only 768 kHz. The ADC could operate based off a worse power supply (50 dB PSRR) and a lower sampling rate and number of bits. This allows for low-power operation when high-quality recording is not necessary.

Figure 4:
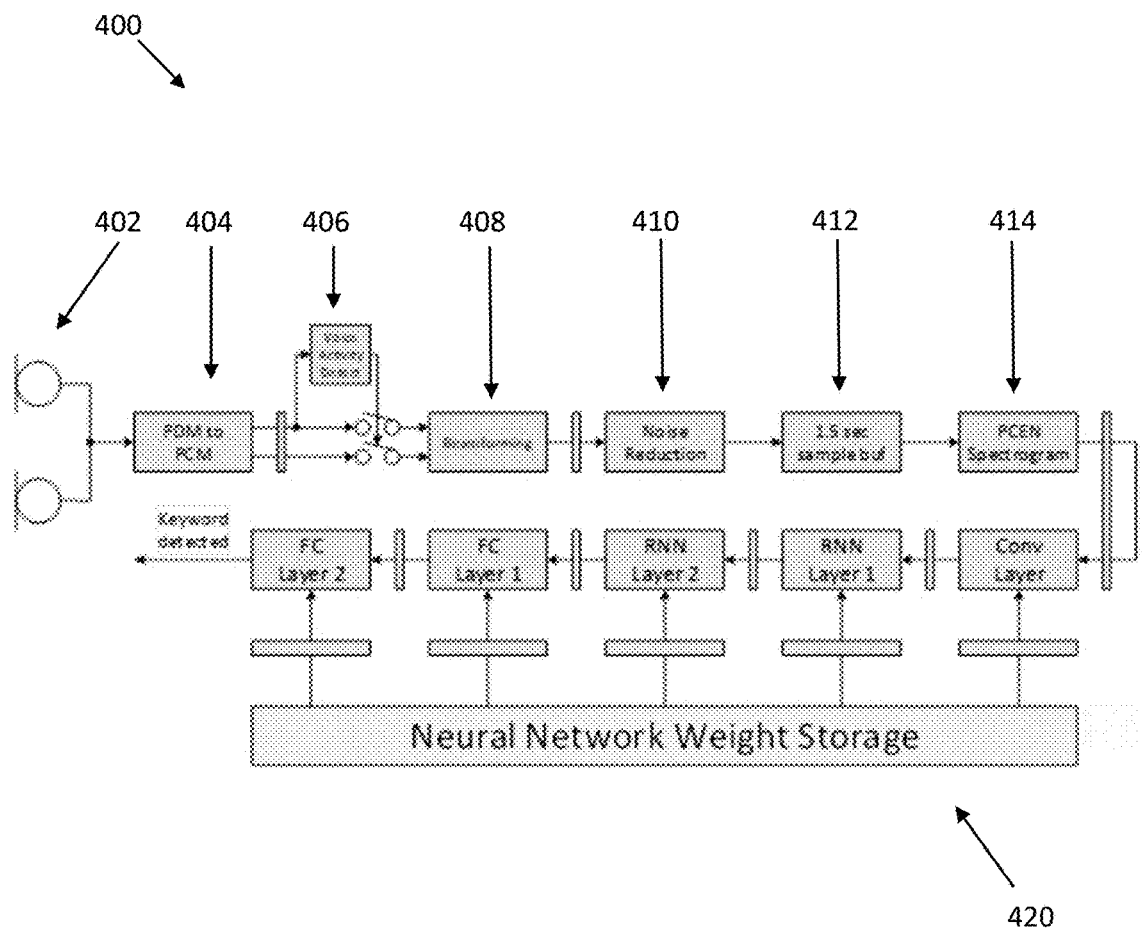
FIG. 4 is a schematic block diagram of a voice processing system with neural network processing.

FIG. 4 illustrates a hardware implementation 400 that includes neural network-based processing. In the illustrated embodiment, 1-bit oversampled PDM microphone data 402 is converted by a PDM to PCM block 404 to a multibit PCM signal at the nominal sample rate. If voice is present in the audio, a Voice Activity Detector 406 will send the audio further down the data path, first to a Beamforming block 408, and then to a Noise reduction block 410. Some amount of speech, for example 1.5 s, is stored in a sample buffer 412. A Spectrogram block 414 converts the signal to the frequency domain, and 5-stage of Neural Network 420 processes the resulting signal. The neural network 420 can include Convolution layer, one or more Recurrent Neural Network layers and one or more Fully-Connected layers. The resulting data will indicate if a Keyword, or an Audio command, has been detected.

As will be understood, various other embodiments can augment or substitute for neural network 420. For example, audio processing systems based on deep structured learning, hierarchical learning, deep machine learning, or other suitable deep learning algorithms associated with convolutional, feedforward, recurrent, or other suitable neural network can be used. In some embodiments, deep learning-based audio processing systems can be hierarchical, corresponding to multiple layers in deep convolutional neural networks, with the final layer of a convolutional layer network outputting confidence values for detected keywords.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

Embodiments in accordance with the present disclosure may be embodied in whole or in part as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A voice processing system comprising:
a plurality of non-audio sensors;
at least one microphone system;
a plurality of audio modules, at least some of which can be configured in selected modes; and
a context determination module connected to the plurality of audio modules, and further connected to receive input from the plurality of non-audio sensors and the at least one microphone system, the context determination module acting to determine use context for the voice processing system and selecting mode operation of at least some of the plurality of audio modules;
wherein the plurality of audio modules includes a voice activity detection module, a beam forming module, a noise reduction module, a key word detection module, and a command phrase detection module.

2. The system of claim 1, wherein the plurality of non-audio sensor systems includes at least one member of the following: accelerometer, vibration sensor, light sensor, gyroscopes, buttons, touch screen input, keyboard input, received wireless connection, camera/video input, ultrasonic sensor, LIDAR sensor, fingerprint sensor, magnetic field sensor, pressure, step counter, GNSS/GPS derived input, proximity sensor, temperature sensor, and oxygen sensor.

3. The system of claim 1, wherein the plurality of audio modules includes at least one of an acoustic echo cancellation module, a wind noise rejection module, and automatic gain control module, and an active noise cancellation module.

4. The system of claim 1, wherein mode operation distinctions can include at least one of selected sleep states, power modes, activation, sampling rate, bit precision, filter state, filter usage, processing speed, ADC configuration, adjustments to sensitivity of sensors or microphones, adjustments to performance of a programmable gain amplifier, selection of decimation or anti-aliasing filters, number of filter taps, adaptive filter update rate, number of sub-bands, selected filter coefficients, available machine learning systems, number of connected microphones used, and available connected memory.

5. The system of claim 1, wherein context identifiable by the context determination module includes at least one of location, an activity, and an environment.

6. The system of claim 1, wherein audio modules are configured to meet a desired Signal to Noise ratio performance metric.

7. The system of claim 1, wherein audio modules are configured to meet a desired power usage.

8. The system of claim 1, wherein audio modules are configured to meet a desired performance metric.

9. The system of claim 1, wherein context is used to configure audio modules to meet desired power usage and performance metrics.

10. A voice processing method comprising the steps of:
providing a plurality of non-audio sensors;
providing at least one microphone system;
configuring a plurality of audio modules to support selected modes; and
receiving input from the plurality of audio modules, the plurality of non-audio sensors, and the at least one microphone system and acting to determine use context for the voice processing system and selecting mode operation of at least some of the plurality of audio modules;
wherein the plurality of audio modules includes a voice activity detection module, a beam forming module, a noise reduction module, a key word detection module, and a command phrase detection module.

11. The method of claim 10, wherein the plurality of non-audio sensor systems includes at least one member of the following: accelerometer, vibration sensor, light sensor, gyroscopes, buttons, touch screen input, keyboard input, received wireless connection, camera/video input, ultrasonic sensor, LIDAR sensor, fingerprint sensor, magnetic field sensor, pressure, step counter, GNSS/GPS derived input, proximity sensor, temperature sensor, and oxygen sensor.

12. The method of claim 10, wherein the plurality of audio modules includes at least one of an acoustic echo cancellation module, a wind noise rejection module, and automatic gain control module, and an active noise cancellation module.

13. The method of claim 10, wherein mode operation distinctions can include at least one of selected sleep states, power modes, activation, sampling rate, bit precision, filter state, filter usage, processing speed, ADC configuration, adjustments to sensitivity of sensors or microphones, adjustments to performance of a programmable gain amplifier, selection of decimation or anti-aliasing filters, number of filter taps, adaptive filter update rate, number of sub-bands, selected filter coefficients, available machine learning systems, number of connected microphones used, and available connected memory.

14. The method of claim 10, wherein context identifiable by the context determination module includes at least one of location, an activity, and an environment.

15. The method of claim 10, wherein audio modules are configured to meet a desired Signal to Noise ratio performance metric.

16. The method of claim 10, wherein audio modules are configured to meet a desired power usage.

17. The method of claim 10, wherein audio modules are configured to meet a desired performance metric.

18. The method of claim 10, wherein context is used to configure audio modules to meet desired power usage and performance metrics.

* * * * *